(12) United States Patent
Neale

(10) Patent No.: US 7,686,367 B2
(45) Date of Patent: Mar. 30, 2010

(54) OVER AND UNDER SWING SEAT

(75) Inventor: Colin G. Neale, Northville, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 12/093,467

(22) PCT Filed: Nov. 17, 2006

(86) PCT No.: PCT/CA2006/001869

§ 371 (c)(1),
(2), (4) Date: Jun. 23, 2008

(87) PCT Pub. No.: WO2007/056853

PCT Pub. Date: May 24, 2007

(65) Prior Publication Data

US 2008/0284214 A1    Nov. 20, 2008

(51) Int. Cl.
 *B60N 2/01* (2006.01)
 *B60N 2/36* (2006.01)
(52) U.S. Cl. .................. 296/64; 296/66; 296/65.05; 296/65.13; 297/15
(58) Field of Classification Search ............ 296/63, 296/64, 65.01, 65.05, 65.08, 65.09, 65.13–65.15, 296/66, 37.14–37.16; 297/15, 331
See application file for complete search history.

(56) References Cited

U.S. PATENT DOCUMENTS

| | | | |
|---|---|---|---|
| 5,605,368 A * | 2/1997 | Noma et al. ............... 296/64 |
| 5,868,451 A | 2/1999 | Uno et al. | |
| 5,890,758 A * | 4/1999 | Pone et al. ............... 297/15 |
| 6,073,986 A * | 6/2000 | Neale et al. ............... 296/63 |
| 6,209,943 B1 * | 4/2001 | Neale et al. ............. 296/65.01 |
| 6,224,132 B1 * | 5/2001 | Neale ...................... 296/68.1 |
| 6,338,516 B1 * | 1/2002 | Toyota et al. ............ 296/37.2 |
| 6,457,765 B1 * | 10/2002 | Bergquist et al. .......... 296/64 |
| 6,460,929 B2 | 10/2002 | Kamida | |
| 6,820,913 B2 | 11/2004 | Macey et al. | |
| 6,869,138 B2 | 3/2005 | Rhodes et al. | |
| 6,981,731 B2 * | 1/2006 | Welch et al. ............... 296/68 |
| 7,000,968 B2 * | 2/2006 | Welch et al. ............... 296/68 |
| 7,128,358 B2 * | 10/2006 | Perin ..................... 296/65.09 |
| 7,431,372 B2 * | 10/2008 | Imamura et al. ........ 296/65.09 |
| 2008/0265606 A1 * | 10/2008 | Kanamori et al. ...... 296/65.01 |

* cited by examiner

*Primary Examiner*—Glenn Dayoan
*Assistant Examiner*—Gregory Blankenship
(74) *Attorney, Agent, or Firm*—Clark Hill PLC

(57) ABSTRACT

A seat storage assembly is provided for an automotive vehicle having a floor, a roof, and a rear liftgate extending between the floor and the roof. A pair of spaced apart and parallel tracks is disposed along the floor and extends between fore and aft ends. A recess is formed in the floor rearward of the aft ends of the tracks. A second row seat is slidably engaged and pivotally coupled to the tracks for moving between forward and rearward seating positions, and a stowed position within the recess. A third row swing seat is pivotally coupled to the roof for moving between a seating position and a raised stowed position. Moving the third row swing seat into the raised stowed position enables the second row seat to move between the forward and rearward seating positions, and the stowed position within the recess.

7 Claims, 9 Drawing Sheets

OVER AND UNDER SWING SEAT

FIELD OF THE INVENTION

The invention relates to a seat storage assembly for an automotive vehicle. More particularly, this invention relates to a seat storage assembly that stows a third row swing seat adjacent a rear liftgate to enable a second row seat to move between forward and rearward seating positions, and a stowed position within a recess in the vehicle floor.

BACKGROUND OF THE INVENTION

Certain automotive vehicles, such as minivans and sport utility vehicles include second and third row seats for supporting vehicle passengers above a floor in the vehicle. There are times, however, when a vehicle operator will alternatively desire additional cargo space within the vehicle rather than the additional row or rows of seats. In these instances, storage or removal of the second and third row seats is required to provide the additional cargo space desired.

Space limitations leave few options for stowing both the second and third row seats within the vehicle. Attempts to fold both the second and third row seats into the floor can compromise seat design and comfort. In addition, stowing both the second and third row seats in the floor significantly compromises location of underbody components, including rear suspension, fuel system, exhaust system, spare tire storage and all-wheel-drive capability. It would therefore be desirable to provide a seat storage assembly for stowing both the second and third row seats, which would be compatible with new vehicle designs as well as existing vehicle underbody architecture.

SUMMARY OF THE INVENTION

According to one aspect of the invention, a seat storage assembly is provided for an automotive vehicle having a floor, a roof, and a rear liftgate extending between the floor and the roof. The seat storage assembly includes a pair of spaced apart and parallel tracks disposed along the floor that extends between fore and aft ends. A recess is formed in the floor rearward of the aft ends of the pair of tracks. A second row seat is slidably engaged to the pair of tracks for moving between a forward seating position, a rearward seating position, and pivotally coupled to the tracks for moving between a stowed position within the recess in the floor. A third row swing seat is pivotally coupled to the roof for moving between a seating position and a liftgate stowed position adjacent the rear liftgate. Moving the third row swing seat into the liftgate stowed position enables the second row seat to move between the forward and rearward seating positions, and the stowed position within the recess in the floor.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
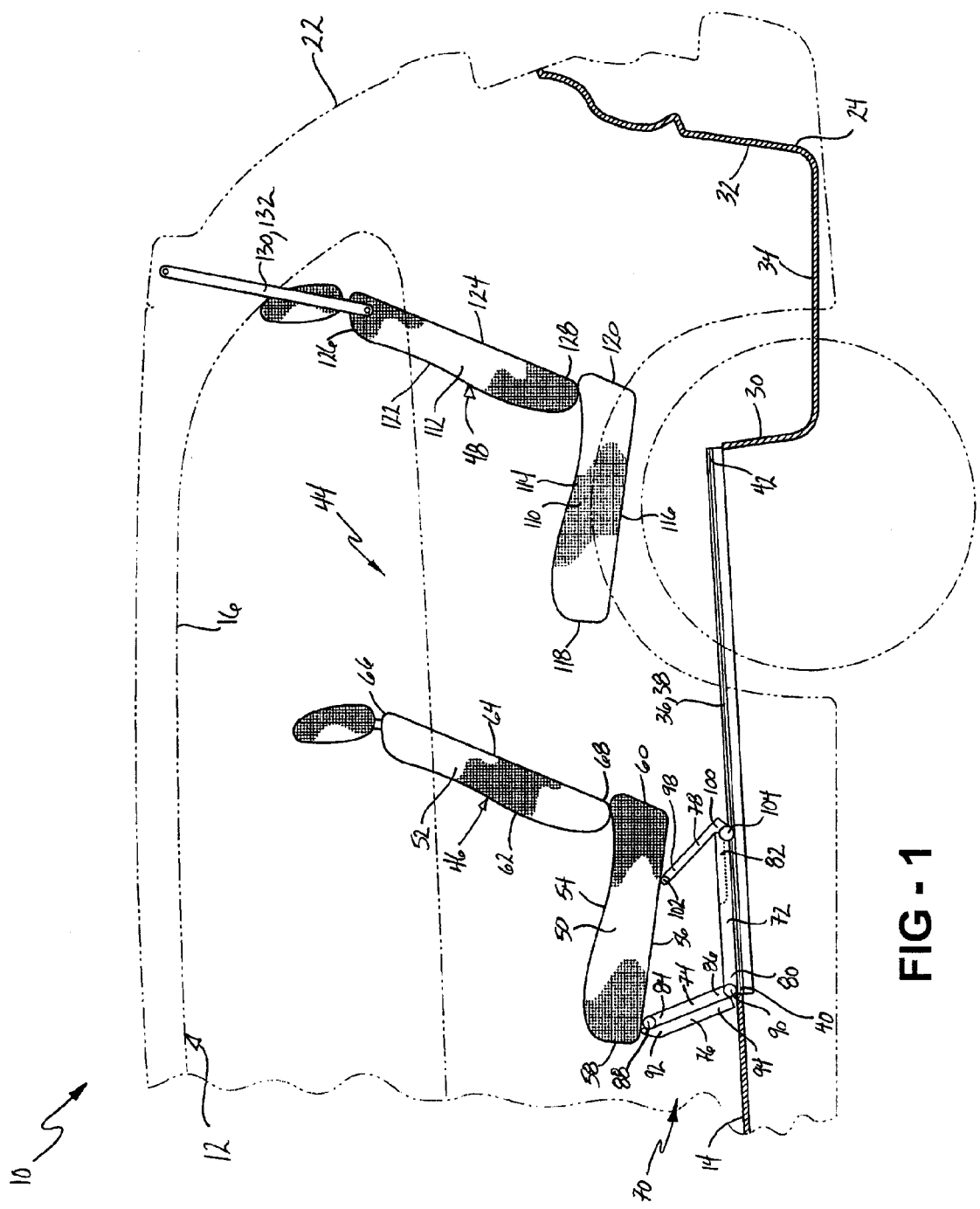
FIG. 1 is a side view of a seat storage assembly within an automotive vehicle according to the invention having a second row seat in a forward seating position and a third row swing seat in a seating position.

Referring to FIGS. 1 through 6, an automotive vehicle, generally shown at 10, includes an interior passenger compartment 12 having a floor 14 and a roof 16. A pair of spaced apart and generally parallel sidewalls 18, 20 interconnect the floor 14 and the roof 16. The floor 14 and the roof 16 are further interconnected by a rear liftgate 22. The rear liftgate 22 is mounted in a conventional manner on the vehicle 10 for pivotal movement about a horizontal axis along an upper edge of the rear liftgate 22. The rear liftgate 22 is selectively opened to allow access to the passenger compartment 12 for loading and unloading cargo.

A recess or well 24 is formed in the floor 14 of the vehicle and includes spaced apart vertical side walls 26, 28 extending between vertical front 30 and rear 32 walls. The side 26, 28, front 30, and rear 32 walls are interconnected by a floor 34. The recess 24 can be used for cargo storage or to stow a vehicle seat, as described in more detail below.

A pair of spaced apart and parallel outboard tracks 36, 38 extend longitudinally along the floor 14. Each of the outboard tracks 36, 38 extends between a fore end 40 and an aft end 42. The aft end 42 of each outboard track 36, 38 is adjacent to the vertical front wall 30 of the recess 24 in the floor 14.

Figure 2:
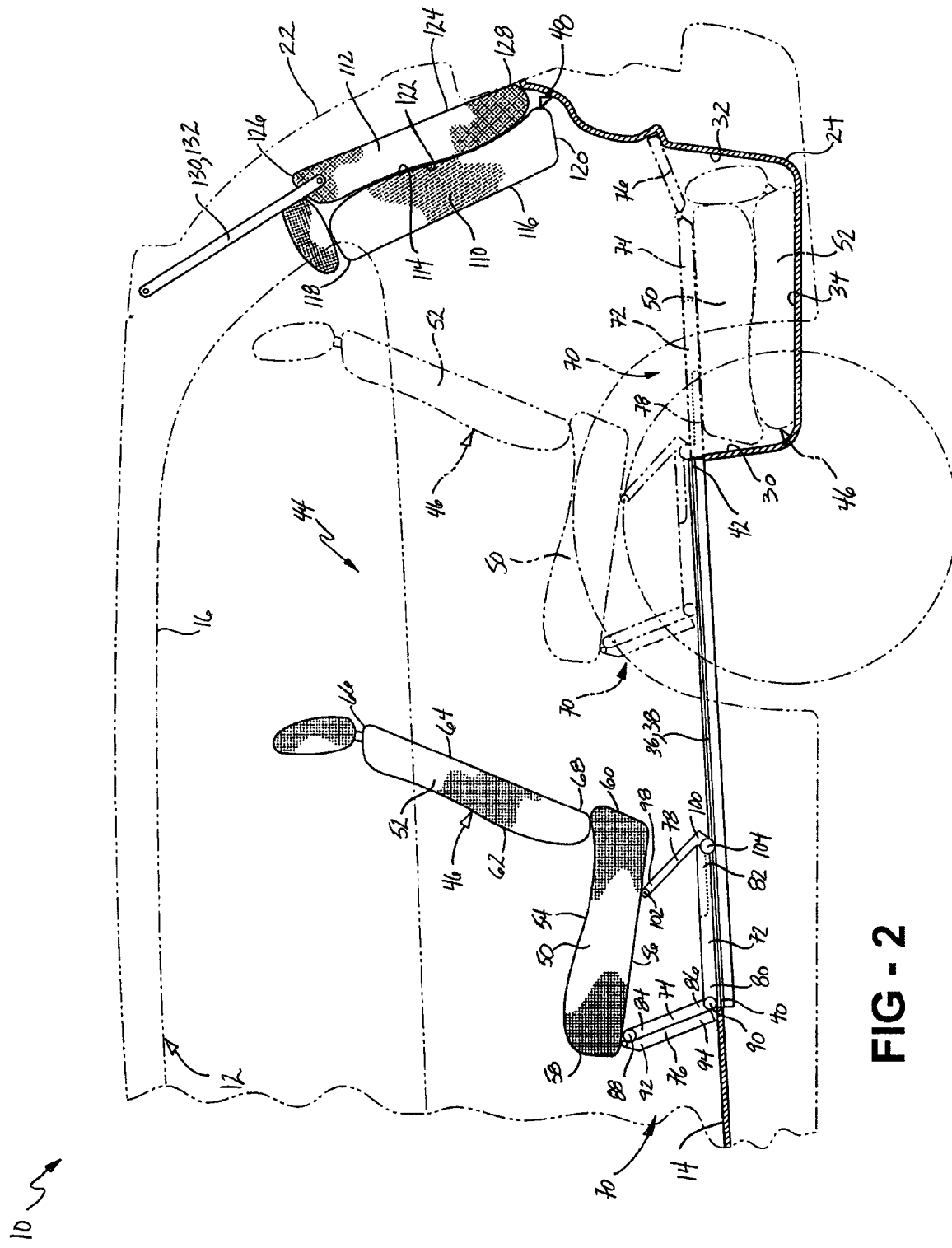
FIG. 2 is a side view of the seat storage assembly including the second row seat in the forward seating position illustrated in solid lines, in a rearward seating position illustrated in hidden lines, and in a stowed position illustrated in hidden lines, and the third row swing seat in a liftgate stowed position.

A seat storage assembly, generally shown at 44, includes a second row seat, generally indicated at 46, and a third row swing seat, generally indicated at 48. The second row seat 46 is movable between a forward seating position, a rearward seating position, and a stowed position within the recess 24 in the floor 14. Referring to FIG. 2, the second row seat 46 is shown in the forward seating position in solid lines, the rearward seating position in hidden lines, and the stowed position in hidden lines. The third row swing seat 48 is movable between a seating position, as shown in FIG. 1, and a liftgate stowed position adjacent the rear liftgate 22, as shown in FIG. 2.

The second row seat 46 includes a seat cushion 50 and a seat back 52. The seat cushion 50 includes an upper seating surface 54 and an opposite bottom surface 56, and extends between a front end 58 and a rear end 60. The seat back 52 includes a back supporting surface 62 and an opposite rear surface 64, and extends between an upper end 66 and a lower end 68. The lower end 68 of the seat back 52 is pivotally coupled to the rear end 60 of the seat cushion 50 by a recliner mechanism (not shown) of any suitable type known in the vehicle seating art. The seat back 52 is selectively adjustable between a plurality of reclined seating positions and a forwardly folded flat position with the back supporting surface 62 overlying the seating surface 54 of the seat cushion 50.

A riser mechanism, generally shown at 70, is disposed between the bottom surface 56 of the seat cushion 50 and the floor 14. In the embodiment shown, the riser mechanism 70 extends continuously, substantially between the sidewalls 18, of the passenger compartment 12. The riser mechanism 70 allows for selective pivotal movement of the second row seat 46 between the rearward seating position and the stowed position within the recess 24 in the floor 14. As can be seen in FIG. 2, the rear surface 64 of the seat back 52 is disposed adjacent the floor 34 of the recess 24 when the second row seat 46 is pivoted into the stowed position.

The riser mechanism 70 includes a main panel 72, a front panel 74, a cover panel 76, and a rear panel 78. Referring to FIGS. 1 through 4, when the second row seat 46 is in either of the forward or rearward seating positions, the main panel 72 is disposed along the floor 14. The main panel 72 extends between a first end 80 and a second end 82. The front panel 74 is disposed at the front end 58 of the seat cushion 50 and extends between an upper end 84 and a lower end 86. The upper end 84 of the front panel 74 is pivotally coupled at a first pivot 88 to the bottom surface 56 of the seat cushion 50. The lower end 86 of the front panel 74 is pivotally coupled at a second pivot 90 to the first end 80 of the main panel 72. The cover panel 76 is disposed adjacent to the front panel 74. The cover panel 76 extends between a proximal end 92 pivotally coupled at the first pivot 88 to the upper end 84 of the front panel 74 and a free distal end 94. The distal end 94 of the cover panel 76 includes a recessed handle 96 formed therein, as shown in FIG. 5.

Referring back to FIG. 1, the rear panel 78 is disposed at the rear end 60 of the seat cushion 50. The rear panel 78 extends between an upper end 98 and a lower end 100. The upper end 98 of the rear panel 78 is pivotally coupled at a first pivot 102 to the bottom surface 56 of the seat cushion 50. The lower end 100 of the rear panel 78 is pivotally coupled at a second pivot 104 to the second end 82 of the main panel 72.

Figure 5:
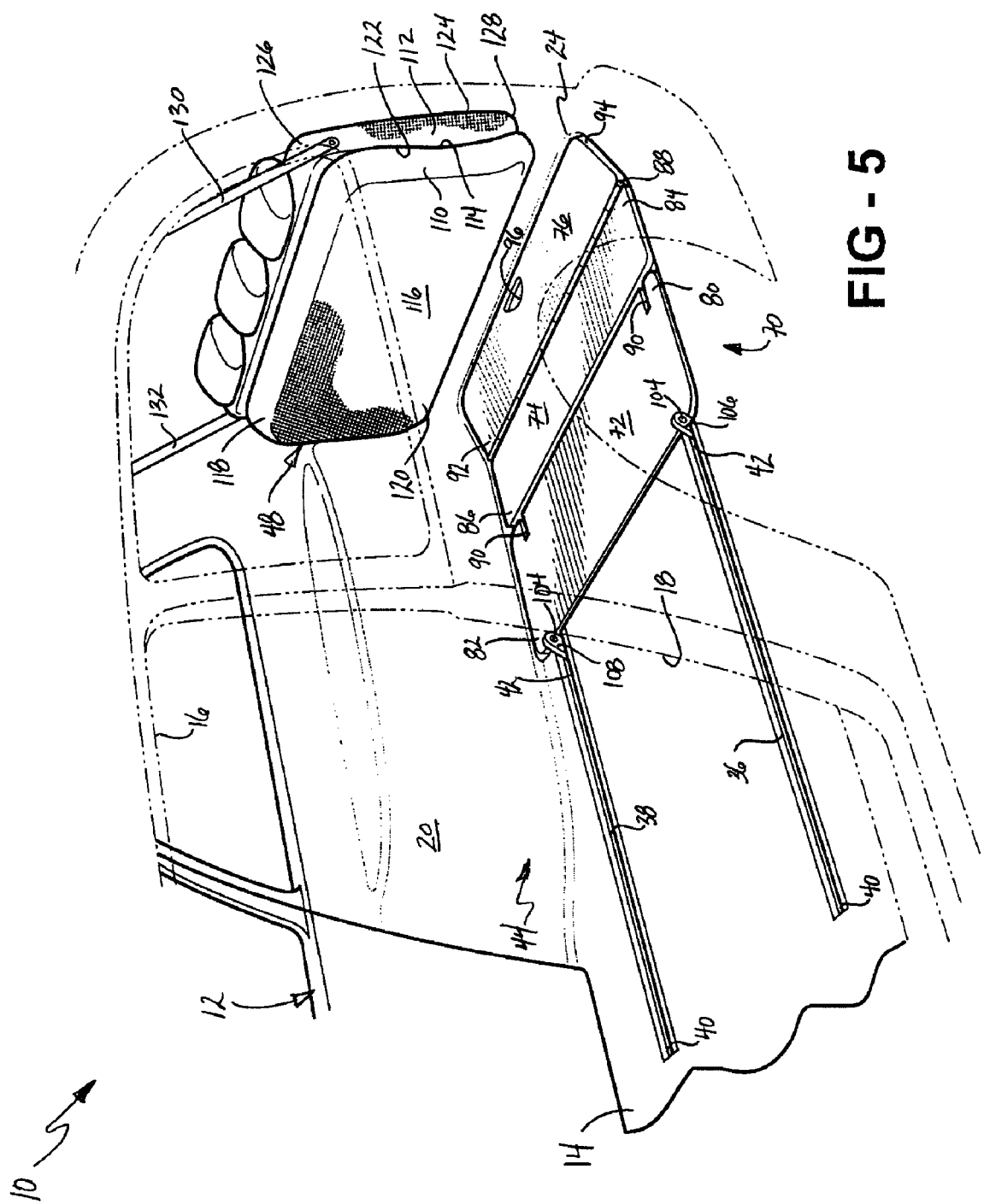
FIG. 5 is a perspective view of the seat storage assembly including the second row seat in the stowed position and the third row swing seat in the liftgate stowed position.
Figure 6:
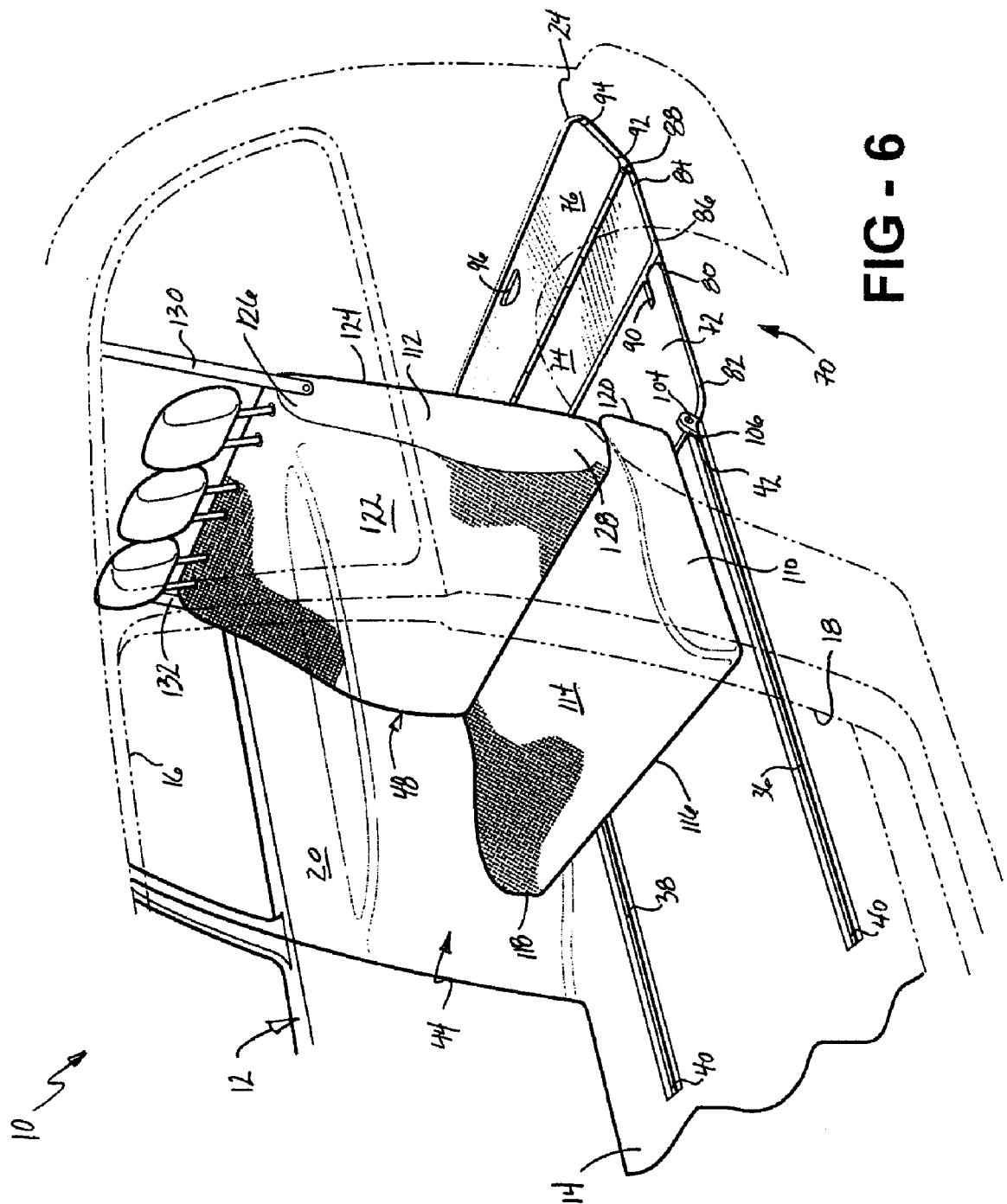
FIG. 6 is a perspective view of the seat storage assembly including the second row seat in the stowed position and the third row swing seat in the seating position.

When the second row seat 46 is in the stowed position within the recess 24 in the floor 14 the riser mechanism 70 is folded flat covering the second row seat 46. More specifically, the rear panel 78, main panel 72, front panel 74, and the cover panel 76 are linearly aligned, forming a cargo floor to cover the recess 24, as shown in FIGS. 2, 5 and 6. The handle 96 at the distal end 94 of the cover panel 76 provides access to the second row seat 46 in the recess 24 in order to return the second row seat 46 to the rearward seating position.

It is contemplated that each of the pivots 88, 90, 102, 104 may include a ratchet mechanism (not shown), as is well known to one skilled in the art, that actuates between a locked condition when the riser mechanism 70 is supporting the second row seat 46 in either of the forward or rearward seating positions and an unlocked condition to allow the second row seat 46 to pivot into the stowed position.

Referring to FIG. 5, a pair of fingers 106, 108 extends between the riser mechanism 70 and the outboard tracks 36, 38. Each one of the fingers 106, 108 is pivotally coupled to the second end 82 of the main panel 72 at the second pivot 104 and slidably engages one of the outboard tracks 36, 38. The second row seat 46 is, therefore, slidably movable along the outboard tracks 36, 38 between the forward and rearward seating positions. The riser mechanism 70 is lockingly engaged to the floor 14 when the second row seat 46 is in one of the forward or rearward seating positions to prevent the second row seat 46 from inadvertently moving fore and aft along the outboard tracks 36, 38.

The third row swing seat 48 is more fully described in U.S. Pat. Nos. 6,073,986; 6,209,943; 6,224,132; 6,631,946; 6,981,731; and 7,000,968. The third row swing seat 48 includes a seat cushion 110 and a seat back 112. The seat cushion 110 includes an upper seating surface 114 and an opposite bottom surface 116, and extends between a front end 118 and a rear end 120. The seat back 112 includes a back supporting surface 122 and an opposite rear surface 124, and extends between an upper end 126 and a lower end 128. The rear end 120 of the seat cushion 110 is pivotally coupled to the lower end 128 of the seat back 112 and is releasably coupled to the opposing sidewalls 18, 20. The seat cushion 110 is capable of being pivoted between a conventional seating position and a folded position wherein the seating surface 114 is disposed alongside the back supporting surface 122 of the seat back 112.

A pair of swing arms 130, 132 extend upwardly from the upper end 126 of the seat back 112 to the roof 16 of the passenger compartment 12 for supporting the third row swing seat 48 in the seating position above the floor 14. The swing arms 130, 132 are pivotally coupled to the roof 16 for moving the third row swing seat 48 between the seating position and the liftgate stowed position adjacent the rear liftgate 22, as shown in FIGS. 2 through 5. As can be seen in FIG. 2, the rear surface 124 of the seat back 112 is disposed adjacent the rear liftgate 22 when the third row seat 48 is swung into the liftgate stowed position. In the liftgate stowed position, the third row swing seat 48 pivots with the rear liftgate 22 as the rear liftgate 22 opens and closes. As a result, unobstructed access to the passenger compartment 12 is provided.

Figure 3:
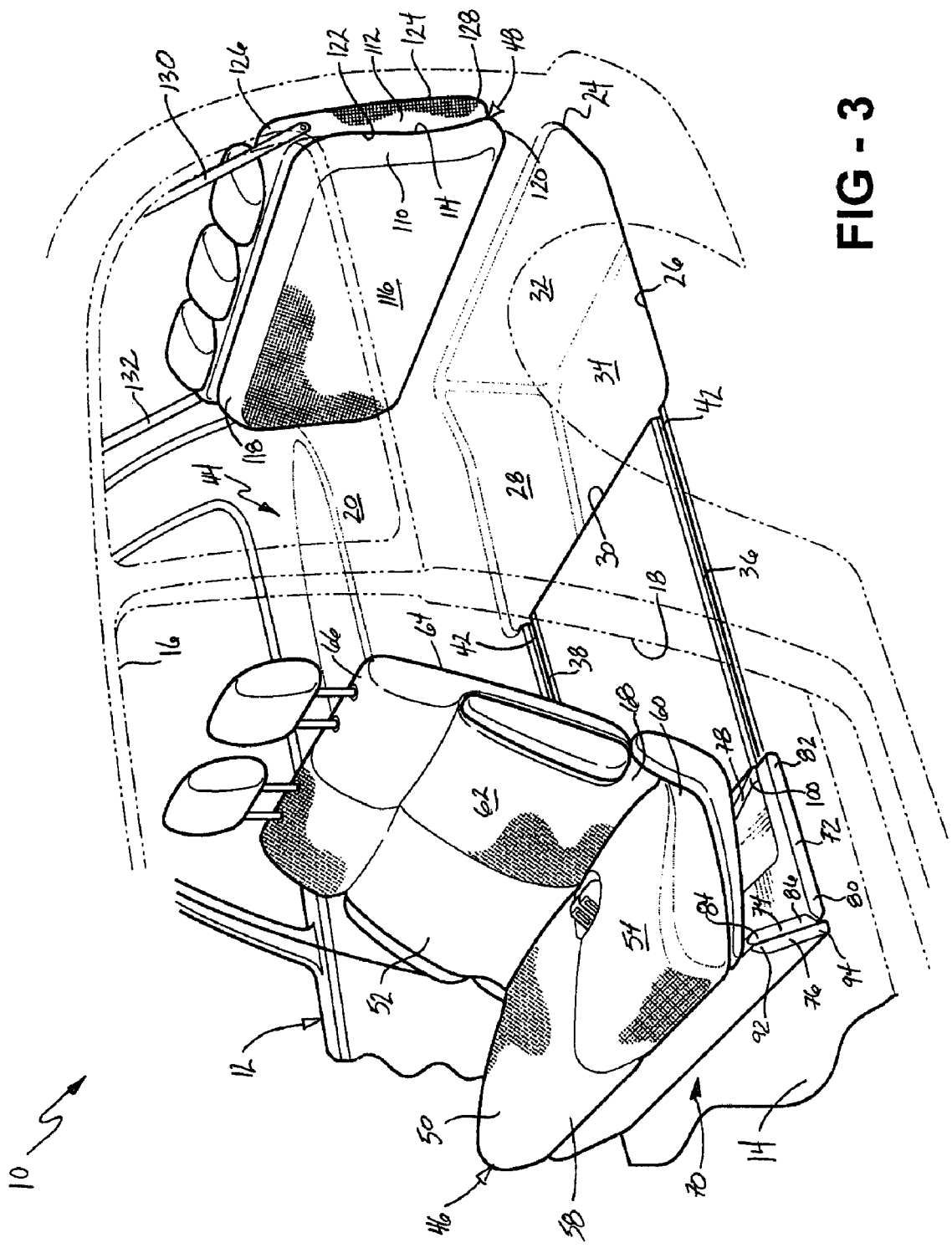
FIG. 3 is a perspective view of the seat storage assembly including the second row seat in the forward seating position and the third row swing seat in the liftgate stowed position.

In operation, to begin, the seat storage assembly 44 is arranged with the second row seat 46 in the forward seating position and the third row swing seat 48 in the seating position, as shown in FIG. 1. The seat cushion 110 of the third row swing seat 48 is released from the sidewalls 18, 20 and then pivoted upwardly against the seat back 112. The swing arms 130, 132 then pivot the third row swing seat 48 rearwardly until the rear surface 124 of the seat back 112 abuts the rear liftgate 22 and is in the liftgate stowed position, as shown in FIG. 3. After the third row swing seat 48 has been moved to the liftgate stowed position adjacent the rear liftgate 22, the seat back 112 may further be latched or otherwise secured to the rear liftgate 22. When the third row swing seat 48 is in the liftgate stowed position, the area in the passenger compartment 12 behind the second row seat 46 can be used as additional cargo space.

Figure 4:
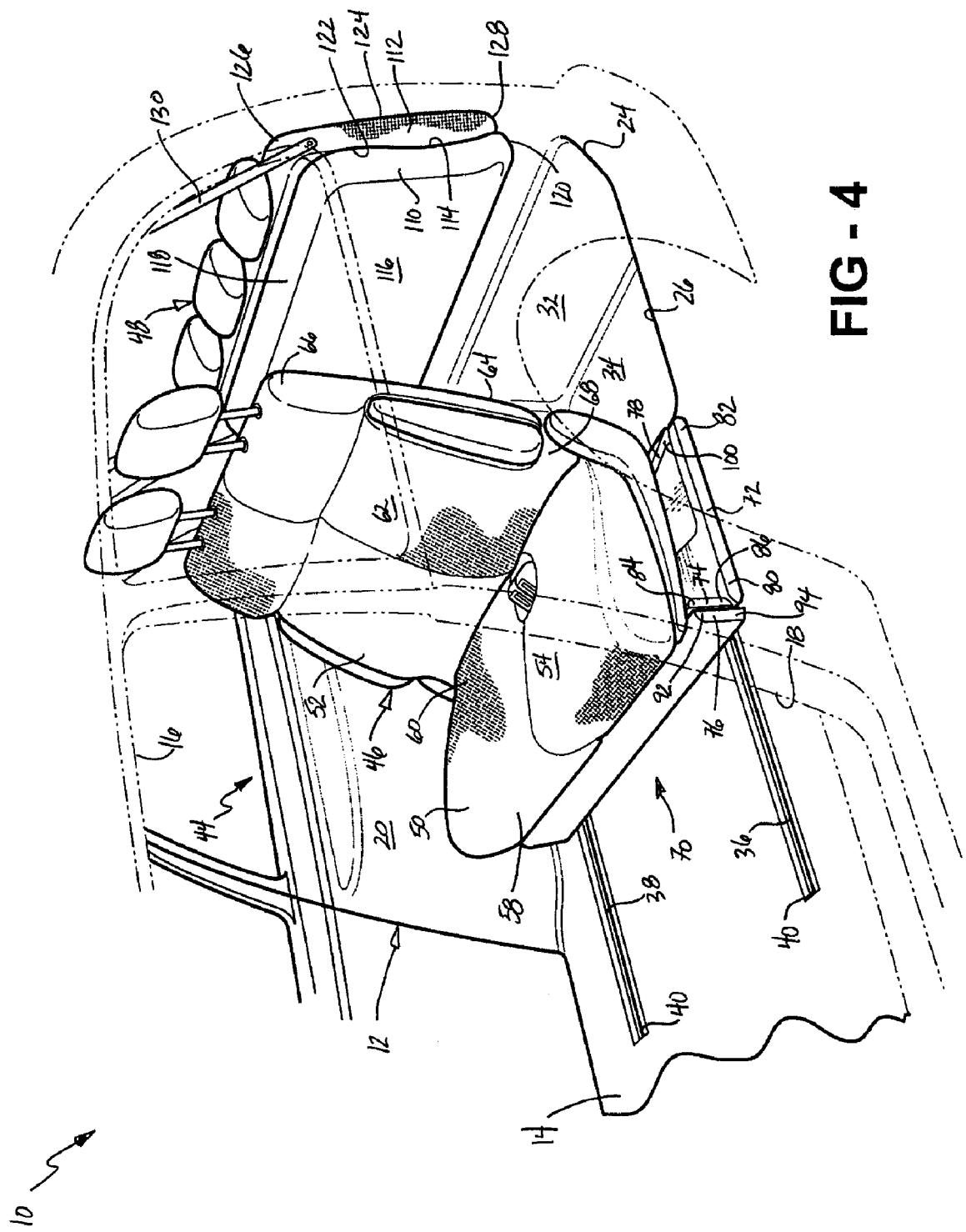
FIG. 4 is a perspective view of the seat storage assembly including the second row seat in the rearward seating position and the third row swing seat in the liftgate stowed position.

Next, the riser mechanism 70 is released from locking engagement with the floor 14 to allow the second row seat 46 to slide rearwardly along the outboard tracks 36, 38 until the riser mechanism 70 reaches the aft ends 42 thereof, as shown in FIG. 4. The riser mechanism 70 is then lockingly engaged to the floor 14 to maintain the second row seat 46 in the rearward seating position. With the second row seat 46 in the rearward seating position, the area in the passenger compartment 12 in front of the second row seat 46 can be used for additional leg room or as cargo space.

In order to move the second row seat 46 into the stowed position within the recess 24, the recliner mechanism is first actuated to pivot the seat back 52 to the fold flat position overlying the seat cushion 50. The riser mechanism 70 is released from locking engagement with the floor 14 and the ratchet mechanisms are actuated to the unlocked condition to allow the second row seat 46 to pivot rearwardly about the second pivot 104 and into the recess 24 in the floor 14. As the second row seat 46 moves into the stowed position the rear panel 78, main panel 72, front panel 74, and cover panel 76 of the riser mechanism 70 fold flat and linearly align to form the cargo floor covering the second row seat 46 within the recess 24, as shown in FIG. 5. When the third row swing seat 48 is in the liftgate stowed position and the second row seat 46 is in the stowed position, cargo space within the passenger compartment 12 of the vehicle 10 is maximized.

Finally, with the second row seat 46 in the stowed position, the third row swing seat 48 may be pivotally returned to the seating position, as shown in FIG. 6. With the third row swing seat 48 in the seating position and the second row seat 46 in the stowed position, the passenger compartment 12 provides maximum leg room in front of the third row swing seat 48 while also providing cargo space behind and below the third row swing seat 48.

Figure 7:
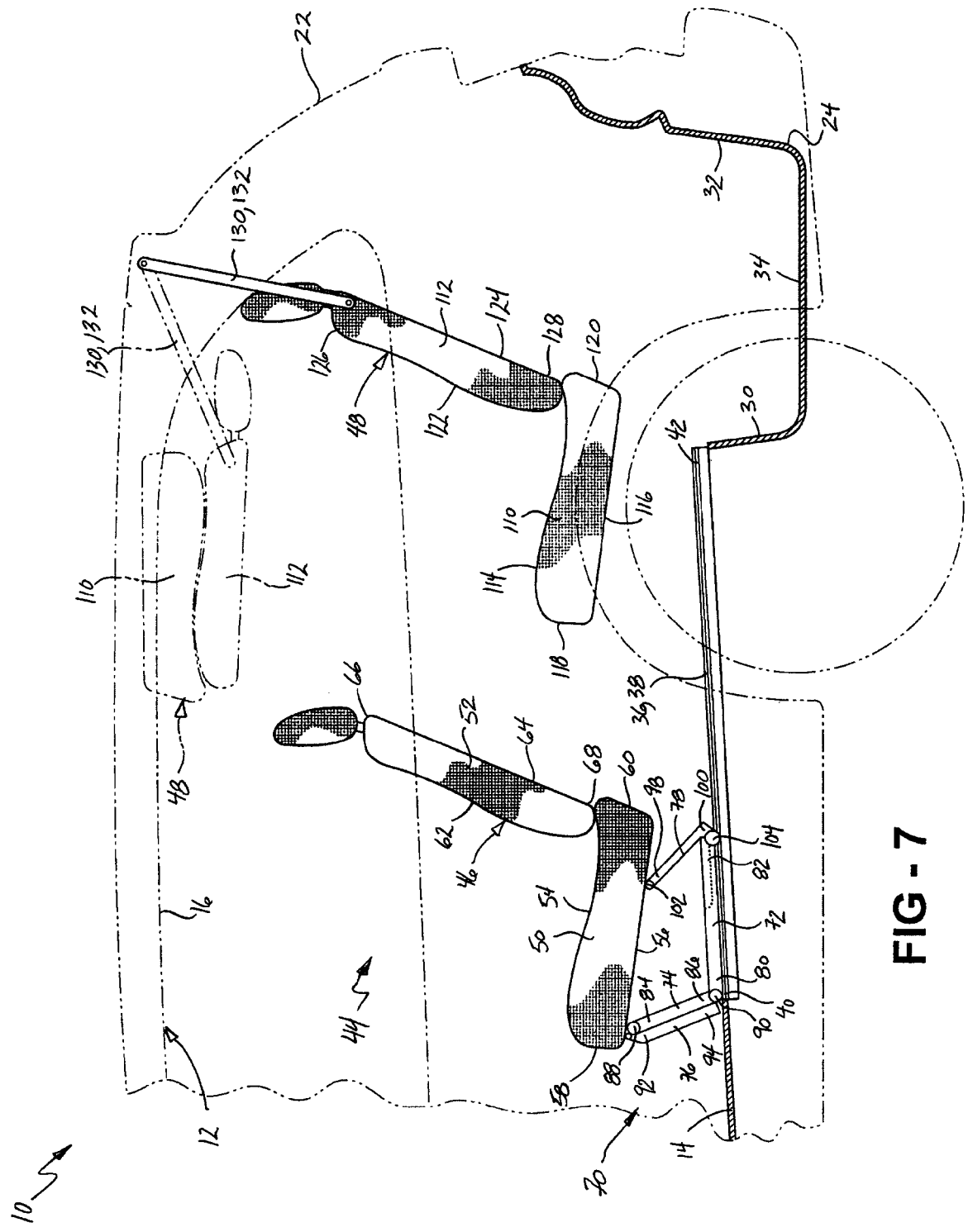
FIG. 7 is a side view of a seat storage assembly according to a second embodiment of the invention including the second row seat in the forward seating position, and the third row swing seat in the seating position illustrated in solid lines and in a raised stowed position illustrated in hidden lines.

Referring to FIG. 7, in a second embodiment of the invention, it is contemplated that the swing arms 130, 132 could in the alternative pivot the third row swing seat 48 between the seating position and a raised stowed position adjacent the roof 16 of the passenger compartment 12. As can be seen in FIG. 7, the bottom surface 116 of the seat cushion 110 is disposed adjacent the roof 16 when the third row seat 48 is swung into the raised stowed position.

Figure 8:
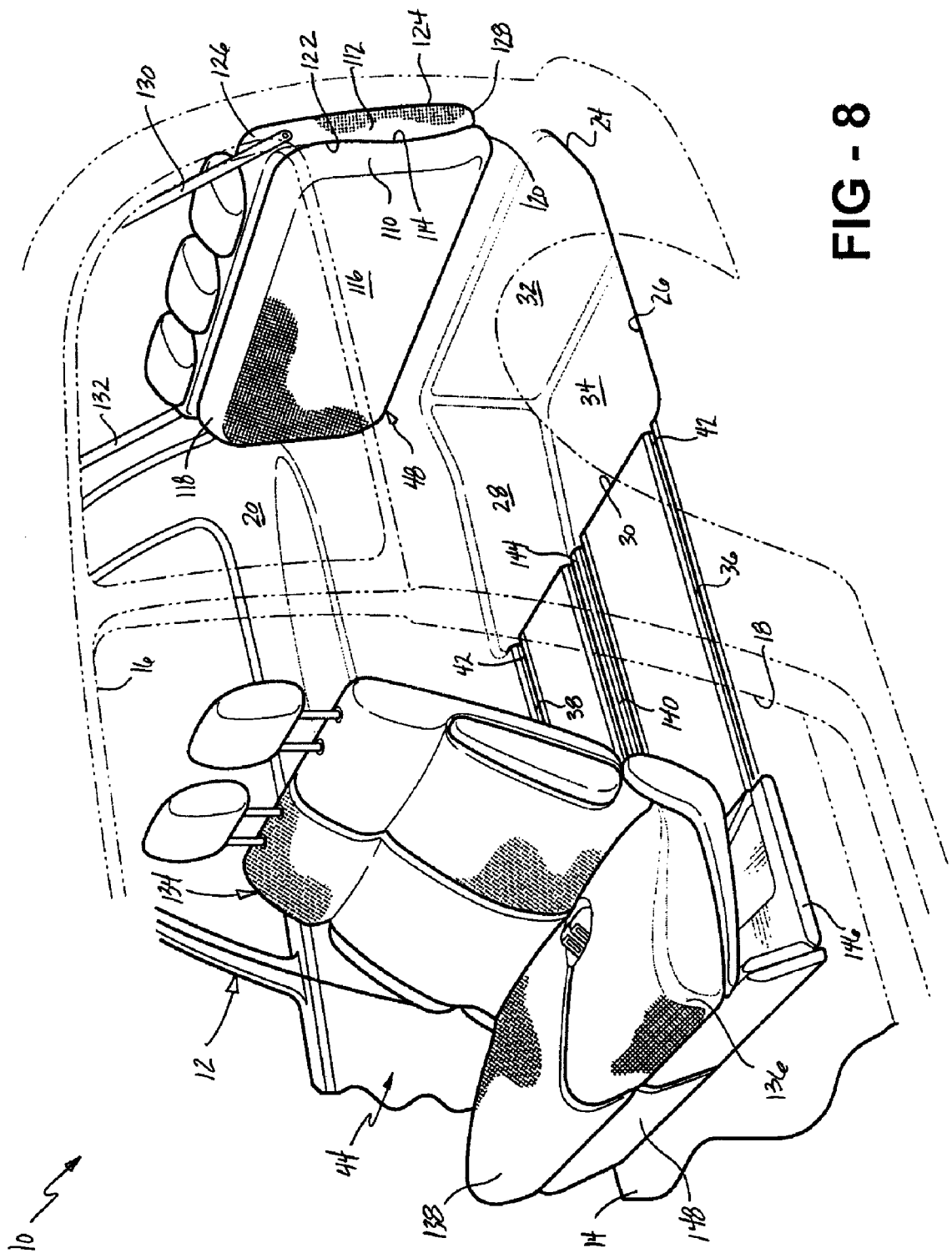
FIG. 8 is a perspective view of a seat storage assembly according to a third embodiment of the invention including a 50/50 split row seat defining a driver side second row seat and a passenger side second row seat.
Figure 9:
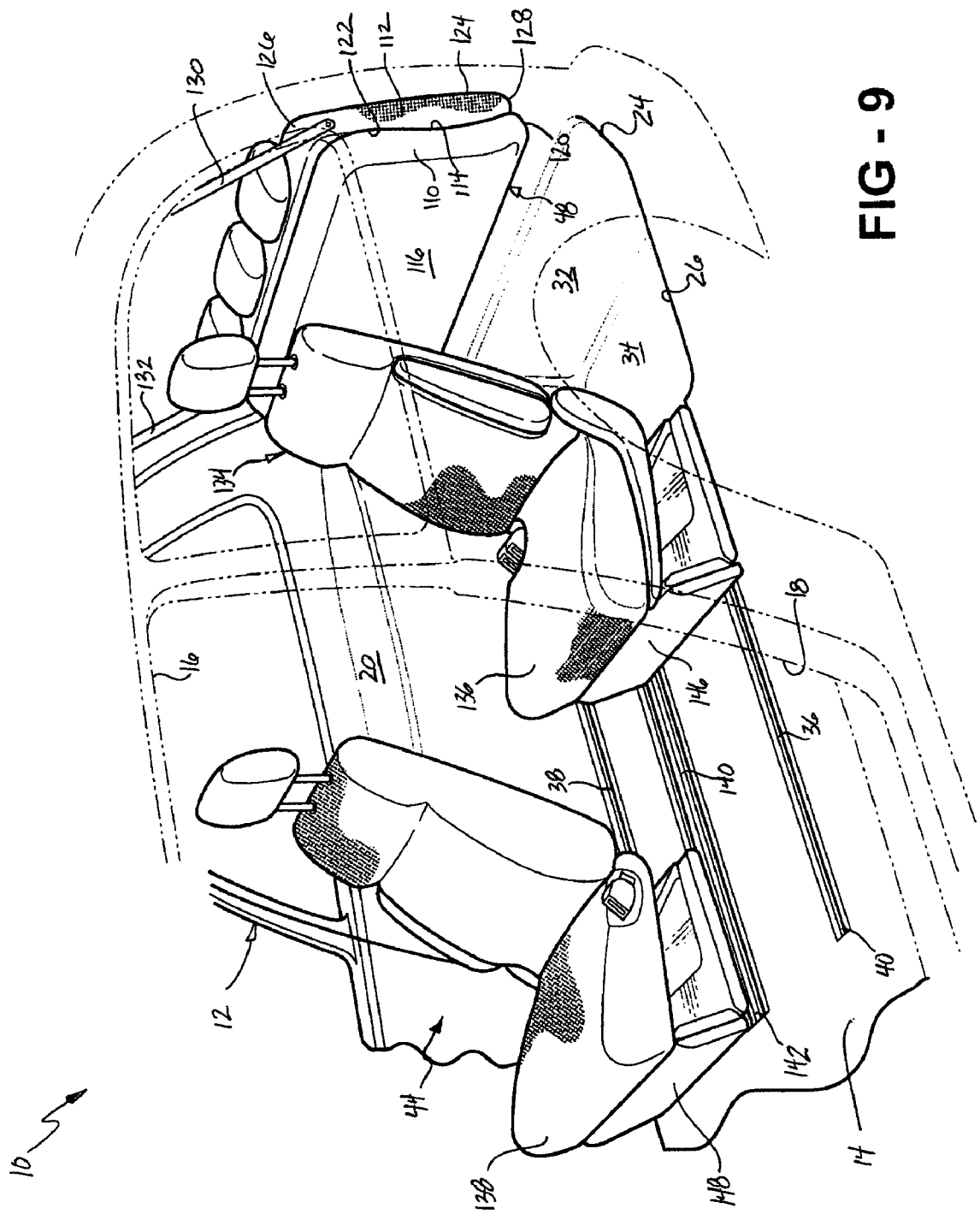
FIG. 9 is a perspective view of the seat storage assembly of FIG. 8 including the driver side seat in the rearward seating position, the passenger side seat in the forward seating position, and the third row swing seat in the liftgate stowed position.

Referring to FIGS. 8 and 9, in a third embodiment of the invention the second row seat is a 50/50 split row seat, generally indicated at 134. The split row seat 134 includes a driver side second row seat 136, and a passenger side second row seat 138. An inboard track 140 is parallel to and disposed between the spaced apart outboard tracks 36, 38 along the floor 14. The inboard track 140 extends between a fore end 142 and an aft end 144 adjacent to the vertical front wall 30 of the recess 24 in the floor 14. The inboard track 140 is a dual track that allows for sliding engagement with a driver side inboard finger (not shown) and a passenger side inboard finger (not shown). The driver side inboard finger extends between the inboard track 140 and a driver side riser mechanism 146. The passenger side inboard finger extends between the inboard track 140 and a passenger side riser mechanism 148.

The 50/50 split row seat 134 provides individual sliding and pivotal movement of each of the driver 136 and passenger 138 side second row seats and, therefore, allows for more flexibility of seating and cargo configurations. It will be appreciated that many other variations of split row seats are contemplated, such as a 60/40 split row seat, without varying from the scope of the invention. It will also be appreciated that the third row swing seat 48 may be a split row seat without varying from the scope of the invention.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for an automotive vehicle having a floor, a roof, and a rear liftgate extending between the floor and the roof, said seat assembly comprising:

a pair of spaced apart and parallel tracks disposed along the floor;

a recess formed in the floor rearward of said pair of tracks;

a second row seat slidably engaged to said pair of tracks for movement between forward and rearward seating positions, and said second row seat pivotally coupled to said pair of tracks to pivot between the rearward seating position and a stowed position within said recess in the floor;

a third row swing seat pivotally coupled to the roof for movement between a seating position and a stowed position wherein movement of said third row swing seat into said stowed position enables said second row seat to move between said forward and rearward seating positions and said stowed position; and a riser mechanism extending between said second row seat and the floor, said riser mechanism defining a plurality of pivots for selectively moving said second row seat between said rearward seating position and said stowed position within said recess in the floor whereby said riser mechanism forms a cargo floor covering said second row seat in said recess, and wherein said riser mechanism includes a main panel, a front panel pivotally coupled to said second row seat and pivotally coupled to said main panel, a cover panel pivotally coupled to said front panel, and a rear panel pivotally coupled to said second row seat and pivotally coupled to said main panel, wherein said panels are folded supporting said second row seat above the floor in said forward and rearward seating positions, and said panels are unfolded forming said cargo floor covering said second row seat in said stowed position.

2. A seat assembly as set forth in claim 1 including a pair of fingers each slidingly engaging one of said pair of seat tracks, and pivotally engaging said riser mechanism.

3. A seat assembly as set forth in claim 2 wherein each one of said pair of fingers pivotally engage said main panel.

4. A seat storage assembly as set forth in claim 3 including at least one swing arm extending upwardly from said third row swing seat and pivotally coupled to the roof for pivoting said third row swing seat between said seating position and said stowed position.

5. A seat assembly for an automotive vehicle having a floor, a roof, and a rear liftgate extending between the floor and the roof, said seat assembly comprising:

a pair of spaced apart and parallel outboard tracks disposed longitudinally along the floor;

a pair of spaced apart and parallel inboard tracks disposed longitudinally between said pair of outboard tracks;

a recess formed in the floor rearward of said pair of outboard tracks and said inboard tracks;

a split second row seat providing independent movement of a driver side seat and a passenger side seat, said driver side seat and said passenger side seat each slidably engaged to one of said pair of outboard tracks and said inboard tracks for movement between forward and rearward seating positions, and pivotally coupled to one of said outboard tracks and said inboard tracks for movement between the rearward seating position and a stowed position within said recess in the floor;

a third row swing seat pivotally coupled to the roof for movement between a seating position and a raised stowed position wherein movement of said third row swing seat into said raised stowed position enables said driver side and passenger side seats to move between said forward and rearward seating positions and said stowed position; and wherein each of said driver side and said passenger side seats includes a riser mechanism, said riser mechanism defining a plurality of pivots for selectively moving a respective one of said driver side and said passenger side seats between said rearward seating position and said stowed position within said recess in the floor whereby said riser mechanism forms a cargo floor covering said respective one of said driver side and said passenger side seats in said recess, and wherein each of said riser mechanisms includes a main panel, a front panel pivotally coupled to said respective one of said driver side and said passenger side seats and pivotally coupled to said main panel, a cover panel pivotally coupled to said front panel, and a rear panel pivotally coupled to said respective one of said driver side and said passenger side seats and pivotally coupled to said main panel, wherein said panels are folded supporting said respective one of said driver side and said passenger side seat above the floor in said forward and rearward seating positions, and said panels are unfolded forming said cargo floor covering said respective one of said driver side and said passenger side seats in said stowed position.

6. A seat assembly as set forth in claim 5 including a finger slidingly engaging each of said inboard and outboard tracks and pivotally engaging each of said riser mechanisms.

7. A seat assembly as set forth in claim 6 including at lease one swing arm extending upwardly from said third row swing seat and pivotally coupled to the roof for pivoting said third row seat between said seating position and said raised stowed position.

* * * * *